US009502937B2

(12) United States Patent
Hamajima et al.

(10) Patent No.: US 9,502,937 B2
(45) Date of Patent: Nov. 22, 2016

(54) TERMINAL FOR STATOR (71) Applicant: AISAN KOGYO KABUSHIKI KAISHA, Aichi-ken (JP)

(72) Inventors: Akira Hamajima, Aichi-ken (JP); Yoshihiko Honda, Aichi-ken (JP); Yoichi Kawakita, Aichi-ken (JP)

(73) Assignee: AISAN KOGYO KABUSHIKI KAISHA, Obu-Shi, Aichi-ken (JP)

( * ) Notice: Subject to any disclaimer, the term of this patent is extended or adjusted under 35 U.S.C. 154(b) by 0 days.

(21) Appl. No.: 14/473,422

(22) Filed: Aug. 29, 2014

(65) Prior Publication Data

US 2015/0076943 A1    Mar. 19, 2015

(30) Foreign Application Priority Data

Sep. 17, 2013 (JP) ................................. 2013-192063

(51) Int. Cl.
*H02K 3/28* (2006.01)
*H02K 3/52* (2006.01)

(52) U.S. Cl.
CPC ............... *H02K 3/28* (2013.01); *H02K 3/522* (2013.01); *H02K 2203/09* (2013.01)

(58) Field of Classification Search
CPC ..... H02K 3/28; H02K 2203/09; H02K 3/522
USPC ..................................................... 310/71, 43
See application file for complete search history.

(56) References Cited

U.S. PATENT DOCUMENTS

| 6,177,741 | B1 * | 1/2001 | Lutkenhaus | H02K 3/47 310/71 |
| 6,856,055 | B2 * | 2/2005 | Michaels | H02K 3/522 310/254.1 |
| 8,193,677 | B2 * | 6/2012 | Murakami | H02K 3/522 310/195 |
| 2006/0138883 | A1 * | 6/2006 | Yagai | H02K 3/522 310/71 |
| 2007/0273221 | A1 * | 11/2007 | Kinoshita | H02K 3/50 310/58 |
| 2010/0187923 | A1 * | 7/2010 | Migita | H02K 3/522 310/71 |
| 2011/0068647 | A1 * | 3/2011 | Sakaue | H02K 3/28 310/71 |

(Continued)

FOREIGN PATENT DOCUMENTS

| JP | H04-137476 | 12/1992 |
| JP | H05-062162 | 8/1993 |

(Continued)

OTHER PUBLICATIONS

Machine translation of JP 2008-312277.*
English Abstract of Japanese Patent Application No. JP 2010-154701.
Machine Translation prepared by the Japanese Patent Office of Japanese Patent Application No. JP 2010-154701.
English Abstract of Japanese Patent Application No. JP H04-137476.
Machine Translation prepared by the Japanese Patent Office of Japanese Patent Application No. JP H05-062162.
English Abstract of Japanese Patent Application No. JP 2014-003809.

(Continued)

*Primary Examiner* — Terrance Kenerly
*Assistant Examiner* — Ahmed Elnakib
(74) *Attorney, Agent, or Firm* — Vierra Magen Marcus LLP (57) ABSTRACT

The first extending portion 26 overlaps the second extending portion 27 in a radial direction at one part in the circumferential direction and overlaps the third extending portion 28 in the radial direction at another part in the circumferential direction. The second extending portion 27 overlaps the first extending portion 26 in the radial direction at one part in the circumferential direction and overlaps the third extending portion 28 in the radial direction at another part in the circumferential direction. The third extending portion 28 overlaps the first extending portion 26 in the radial direction at one part in the circumferential direction and overlaps the second extending portion 27 in the radial direction at another part in the circumferential direction.

3 Claims, 10 Drawing Sheets

(56) References Cited

U.S. PATENT DOCUMENTS

2012/0027629 A1 2/2012 Tanahashi
2013/0336817 A1* 12/2013 Honda ............... H02K 3/50
                                                 417/410.1
2014/0099221 A1 4/2014 Tanahashi

FOREIGN PATENT DOCUMENTS

| JP | 2007-202263 A | | 8/2007 | |
|----|---------------|---|--------|---|
| JP | 2008-312277 | * | 12/2008 | |
| JP | 2010-154701 | | 7/2010 | |
| JP | 2012-031808 | | 2/2012 | |
| JP | 2013-162648 A | | 8/2013 | |
| JP | 2014-003809 | | 1/2014 | |
| JP | 2015140692 | * | 7/2015 | ............. H02K 3/522 |

OTHER PUBLICATIONS

Machine Translation prepared by the Japanese Patent Office of Japanese Patent Application No. JP 2014-003809.
English Abstract of Japanese Patent Application No. JP 2012-031808.
Machine Translation prepared by the Japanese Patent Office of Japanese Patent Application No. JP 2012-031808.
Office Action dated Aug. 23, 2016, in Japanese Patent Appl. No. 2013-192063.

* cited by examiner

TERMINAL FOR STATOR

CROSS-REFERENCE TO RELATED APPLICATION

This application claims priority to Japanese Patent Application No. 2013-192063 filed on Sep. 17, 2013, the contents of which are hereby incorporated by reference into the present application.

TECHNICAL FIELD

This specification discloses a terminal for a stator of a motor.

DESCRIPTION OF RELATED ART

Patent Literature 1 (Japanese Patent Application Publication No. 2010-154701 A) discloses a terminal member for a stator of a three-phase motor. The terminal member includes a plurality of bus rings. The bus rings each extend in a circumferential direction, and are placed at intervals from each other in a radial direction. The bus rings are electrically connected to a coil wire of a U phase, a coil wire of a V phase, and a coil wire of a W phase via connecting parts, respectively.

BRIEF SUMMARY OF INVENTION

According to a technology of Patent Literature 1, a plurality of bus rings of different sizes is arranged in a concentric pattern. That is, a bus ring with a smaller diameter is arranged on an inner side, and a bus ring with a larger diameter is arranged on an outer side. In this configuration, all of the bus rings overlap each other along a radial direction. This requires a larger amount of space in which to place the bus rings, thus causing the whole terminal member to be greater in dimensions.

The present specification provides a technology of a terminal for a stator of a three-phase motor. The terminal for the stator includes: a plurality of first welded portions welded to a coil wire of a first phase; a first extending portion to which the plurality of first welded portions is coupled, the first extending portion extending in an arc shape in a circumferential direction, the plurality of first welded portions being placed at an interval between each other in the circumferential direction; a plurality of second welded portions welded to a coil wire of a second phase; a second extending portion to which the plurality of second welded portions is coupled, the second extending portion extending in an arc shape in the circumferential direction, the plurality of second welded portions being placed at an interval between each other in the circumferential direction; a plurality of third welded portions welded to a coil wire of a third phase; and a third extending portion to which the plurality of third welded portions is coupled, the third extending portion extending in an arc shape in the circumferential direction, the plurality of third welded portions being placed at an interval between each other in the circumferential direction. The first extending portion overlaps the second extending portion in a radial direction at one part in the circumferential direction and overlaps the third extending portion in the radial direction at another part in the circumferential direction. The second extending portion overlaps the first extending portion in the radial direction at one part in the circumferential direction and overlaps the third extending portion in the radial direction at another part in the circumferential direction. The third extending portion overlaps the first extending portion in the radial direction at one part in the circumferential direction and overlaps the second extending portion in the radial direction at another part in the circumferential direction.

In this configuration, the first extending portion and the second extending portion are arranged partially side by side in the radial direction. The first extending portion and the third extending portion are arranged partially side by side in the radial direction. The second extending portion and the third extending portion are arranged partially side by side in the radial direction. The arrangements of two extending portions overlapping each other in the radial direction makes it possible to prevent a large number of (three or more) extending portions from overlapping one another in the radial direction. This can make space smaller in the radial direction. This makes it possible to reduce the size of the terminal for a stator.

DETAILED DESCRIPTION OF INVENTION

Features of the embodiments to be described are listed below. It should be noted that the below-described technical elements are technical elements that are independent of one another, and exert technical utility either alone or in various combinations thereof.

(Feature 1) At least one of the first, second, and third extending portions may include an insertion part extending toward a core of the stator. The insertion part may be formed by bending the extending portion, and may be inserted into an insertion trench formed at an end of the core, with the insertion part being elastically deformed.

In this configuration, the terminal for a stator can be accurately attached to the core.

(Feature 2) The part may include a pair of press-fitting portions inserted into the insertion trench formed at the one end of the core, with a space formed between the pair of press-fitting portions.

In this configuration, insertion of the insertion part into the insertion trench causes the press-fitting portions to be in a pressed state. This allows the insertion part to be fixed to the insertion trench, thus allowing the terminal for a stator to be accurately attached to the core.

(Feature 3) The first welded portion, the second welded portion, and the third welded portion may each include an upper end and a hook portion extending slantingly toward an outer circumferential side and downward from the upper end.

In this configuration, the hook portions can each be hooked on a coil wire. This allows the welded portions to be securely fixed to the coil wires of the respective phases.

(Feature 4) The first welded portion, the second welded portion, the third welded portion, and the insertion part may be placed on an outer side of a coil winding portion.

This configuration makes it possible to prevent sputter from scattering over the core when the welded portions are welded to the respective coil wires.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved terminal for a stator, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment 1

Figure 1:
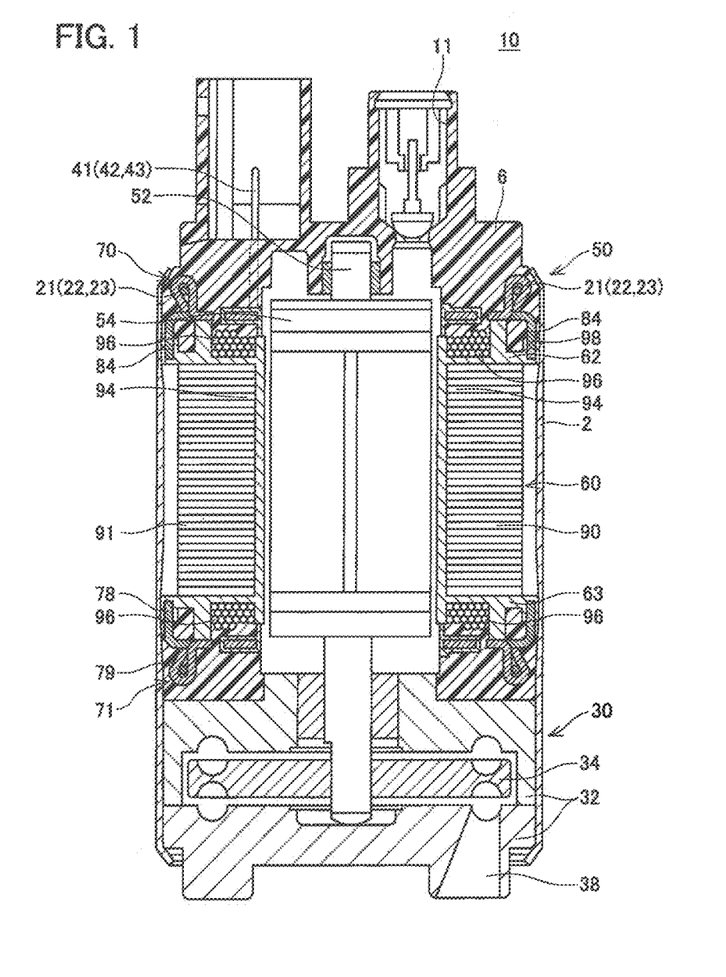
FIG. 1 is a longitudinal sectional view of a fuel pump of Embodiment 1.

As shown in FIG. 1, a stator 60 of the present embodiment is used for a fuel pump 10. The fuel pump 10 is placed inside a fuel tank (not illustrated), and feeds fuel (e.g. gasoline) to an engine (not illustrated) of an automobile. As shown in FIG. 1, the fuel pump 10 includes a motor section 50 and a pump section 30. The motor section 50 and the pump section 30 are placed inside a housing 2. The housing 2 has a cylindrical shape having openings at both ends.

The pump section 30 includes a casing 32 and an impeller 34. The casing 32 closes the opening at the lower end of the housing 2. An inlet 38 is provided at the lower end of the casing 32. A communicating hole (not illustrated) that connects the inside of the casing 32 and the motor section 50 is provided at the upper end of the casing 32. The casing 32 houses the impeller 34.

The motor section 50 is located above the pump section 30. The motor section 50 is a brushless motor. The motor section 50 is a three-phase motor. The motor section 50 includes a rotor 54 and a stator 60. The rotor 54 includes a permanent magnet. Passing through the center of the rotor 54 is a shaft 52 fixed thereto. The shaft 52 has its lower end inserted through a central part of the impeller 34. The rotor 54 is rotatably supported on the shaft 52 by bearings disposed at both ends of the shaft 52. It should be noted that in the embodiment, the upper and lower sides are defined by the state of FIG. 1. That is, the pump section 30 is located in a "lower" position than the motor section 50, and the motor section 50 is located in a "higher" position than the pump section 30.

The stator 60 is placed on an outer circumference of the rotor 54. The stator 60 has its upper and lower ends covered with an outer resin layer 6. The stator 60, covered with the outer resin layer 6, is press-fitted in the housing 2. The outer resin layer 6 closes the opening at the upper end of the housing 2. An outlet 11 is formed at the upper end of the outer resin layer 6. The outlet 11 connects the motor section 50 and a fuel passage located outside the fuel pump 10. The outlet 11 is an opening through which fuel pressurized in the pump section 30 flows out into the fuel passage.

Figure 2:
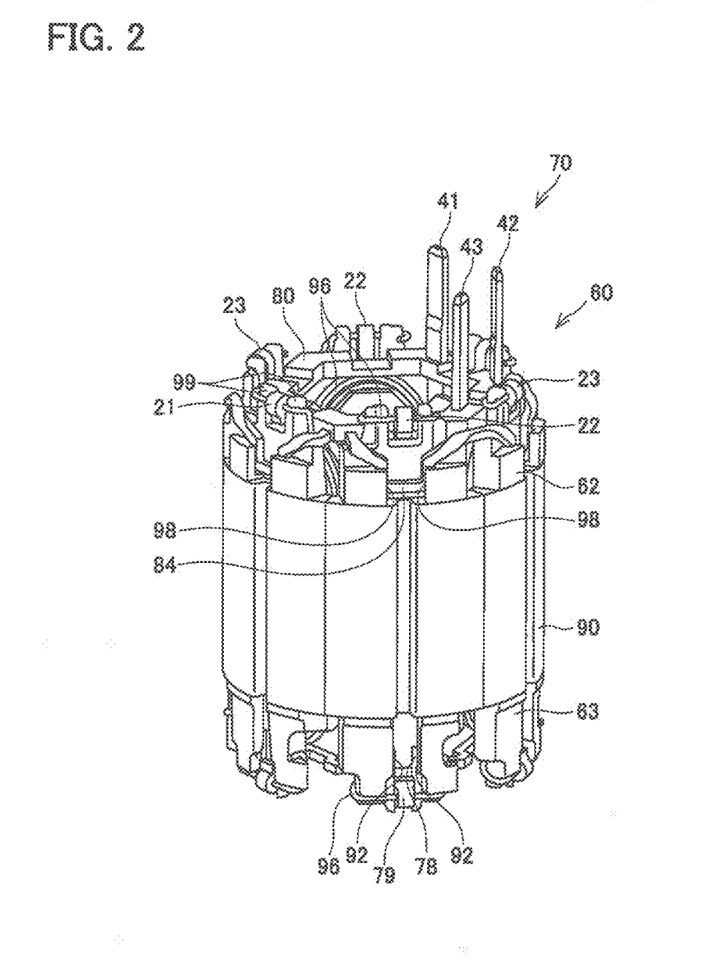
FIG. 2 is a perspective view of a stator of Embodiment 1.
Figure 3:
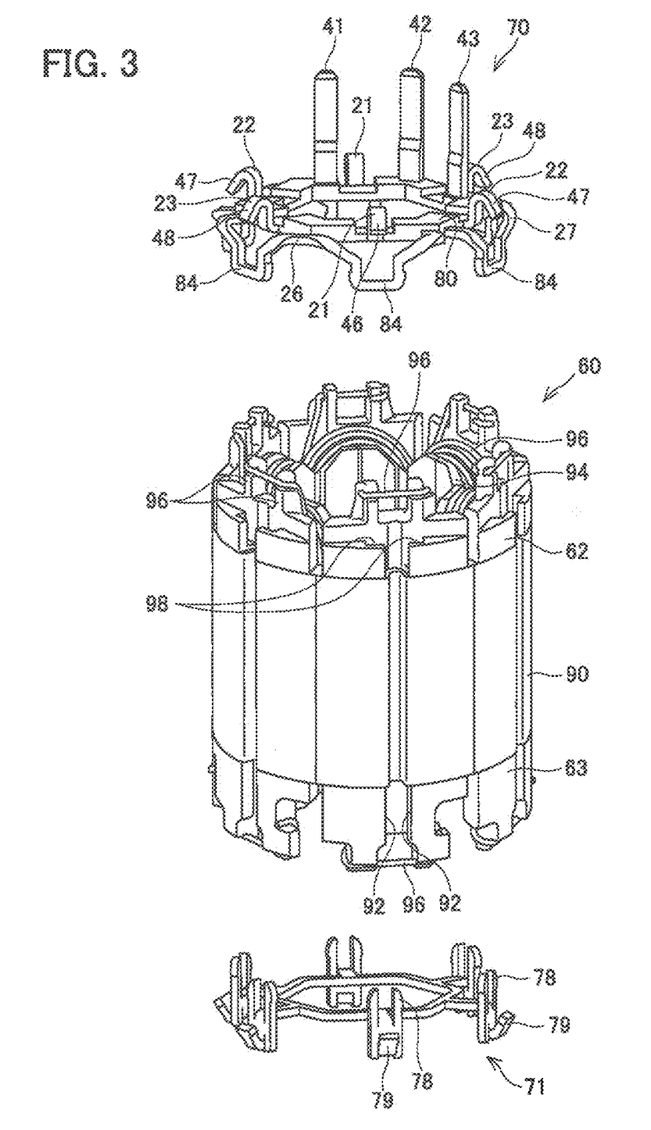
FIG. 3 is an exploded perspective view of the stator of Embodiment 1.

As shown in FIGS. 1 through 3, the stator 60 includes core 90, an upper resin layer 62 and a lower resin layer 63 that cover the core 90, coil wires 96, a terminal 70 for a stator, and a common terminal 71. The core 90 is configured by laminating a plurality of core plates. It should be noted that in light of easiness to see, FIG. 1 shows cross-sections of the coil wires 96 and the plurality of core plates without hatching. The core 90 includes an annular portion 91 and six teeth 94. The annular portion 91 has a cylindrical shape. The six teeth 94 are placed at regular intervals on an inner circumferential surface of the annular portion 91. Each of the teeth 94 extends from the inner circumferential surface of the annular portion 91 toward a central axis of the annular portion 91. The rotor 54 is placed in a central part of the annular portion 91.

The teeth 94 are arranged along an outer circumferential surface of the rotor 54. Each of the teeth 94 has its inner circumferential side end portion fainted in a shape conforming to the outer circumferential surface of the rotor 54. Wound at a middle part between the inner and outer circumferential side ends of each of the teeth 94 is a coil wire 96, with the upper resin layer 62 sandwiched between the teeth 94 and the coil wire 96. Winding of each of the coil wires 96 causes a coil winding portion 97 to be formed in a middle part (i.e. a range C indicated by a dotted line in FIG. 7) between the inner and outer circumferential side ends of each of the tooth 94. Each of the coil wires 96 is covered with an insulation coating.

Feeding of electric power to the stator 60 causes the six teeth 94 to be categorized into two U-phase teeth 94, two V-phase teeth 94, and two W-phase teeth 94 according to a phase of an electric current that is fed to the coil wires 96. The coil wires 96 wound around the two U-phase teeth 94 are electrically connected. Similarly, the coil wires 96 wound around the two V-phase teeth 94 are electrically connected, and the coil wires 96 wound around the two W-phase teeth 94 are electrically connected.

The upper resin layer 62 covers an upper surface of the core 90, the inner circumferential surface of the annular portion 91, and inner circumferential surfaces and side surfaces of the teeth 94. As shown in FIG. 3, the upper resin layer 62 includes a plurality of (in the present embodiment, six pairs of) upper insertion trenches 98, 98. Further, the upper resin layer 62 includes a plurality of (in the present embodiment, six pairs of) wire engagement portions 99, 99 (it should be noted that in FIG. 2, only one pair of wire engagement portions 99, 99 is given a reference sign). The six pairs of upper insertion trenches 98, 98 are placed at regular intervals in a circumferential direction of the annular portion 91. In the circumferential direction of the annular portion 91, the six pairs of upper insertion trenches 98, 98 are located at same positions as the six teeth 94, respectively. The two upper insertion trenches 98 in each pair are placed with a distance between each other in the circumferential direction of the annular portion 91. The upper insertion trenches 98 are formed at one end of the core 90. The upper insertion trenches 98 are formed further outside from the core 90 than the teeth 94 and at an upper end of the stator 60. Each of the upper insertion trenches 98 extends upward and downward in a linear fashion. Each of the upper insertion trenches 98 has its upper end opened and its lower end closed. Each of the two upper insertion trenches 98, 98 in each pair is open toward the other one pair of the two upper insertion trenches 98.

The six pairs of wire engagement portions 99, 99 are placed at regular intervals in the circumferential direction of the annular portion 91. In the circumferential direction of the annular portion 91, the six pairs of wire engagement portions 99, 99 are located at the same positions as the six teeth 94, respectively. The six pairs of wire engagement portions 99, 99 are placed above the six pairs of upper insertion trenches 98, 98, respectively. The two wire engagement portions 99 in each pair 99, 99 are placed with a distance between each other in the circumferential direction of the annular portion 91. The distance between the two wire engagement portions 99 in each pair 99, 99 is greater than the distance between the two upper insertion trenches 98 in each pair 98, 98. The two wire engagement portions 99 in each pair 99, 99 hold therebetween an end of the coil wire 96 wound around the teeth 94 located at the same position as the pair of wire engagement portions 99, 99. The coil wire 96 is laid between the two wire engagement portions 99 in each pair 99, 99.

The lower resin layer 63 covers a lower surface of the core 90, the inner circumferential surface of the annular portion 91, and the inner circumferential surfaces and side surfaces of the teeth 94. The lower resin layer 63 includes a plurality of (in the present embodiment, six pairs of) lower insertion trenches 92, 92. The six pairs of lower insertion trenches 92, 92 are placed at regular intervals in the circumferential direction of the annular portion 91. In the circumferential direction of the annular portion 91, the six pairs of lower insertion trenches 92, 92 are located at the same positions as the six teeth 94, respectively. The two lower insertion trenches 92 in each pair 92, 92 are placed with a distance between each other in the circumferential direction of the annular portion 91. The lower insertion trenches 92 are formed on an outer side from the core 90 than the teeth 94 and at a lower end of the stator 60. Each of the lower insertion trenches 92 extends upward and downward in a linear fashion. Each of the lower insertion trenches 92 has its lower end opened and its upper end closed. Each of the two lower insertion trenches 92 in each pair 92, 92 is open toward the other lower insertion trench 92 of the pair 92, 92.

Figure 4:
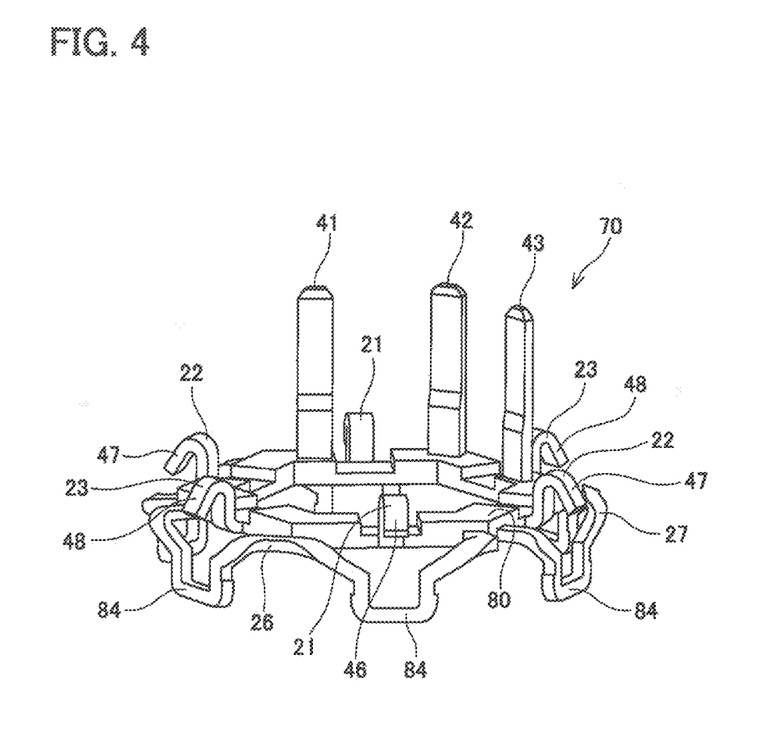
FIG. 4 is a perspective view of a terminal for the stator of Embodiment 1.
Figure 5:
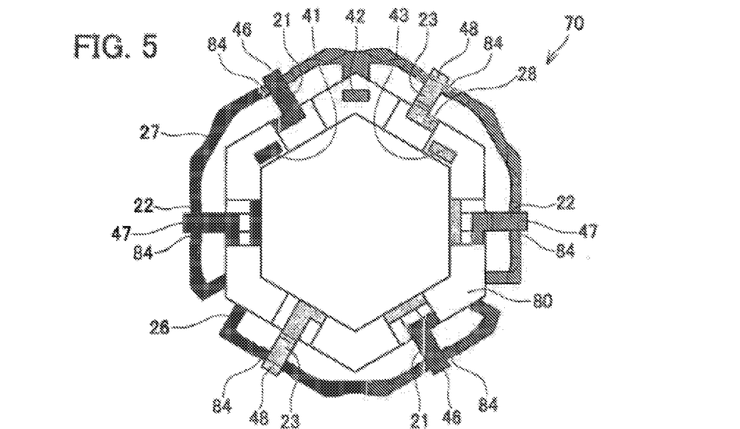
FIG. 5 is a top view of the terminal for the stator of Embodiment 1.
Figure 6:
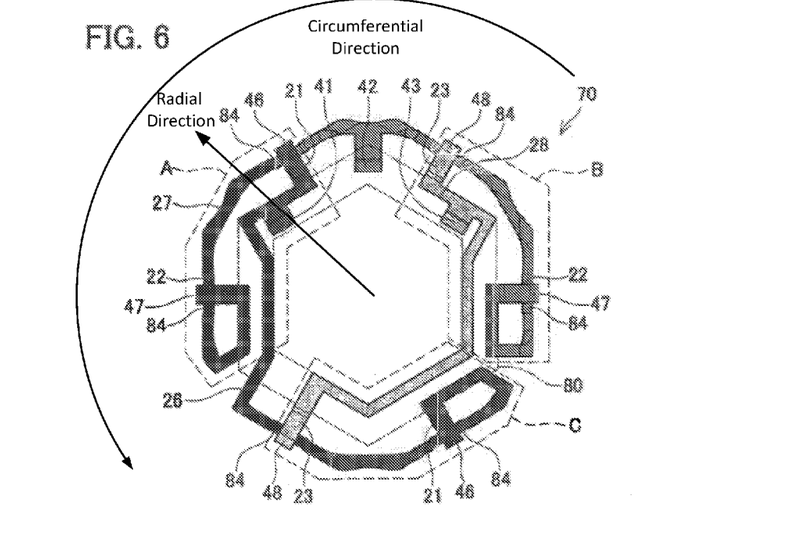
FIG. 6 is a top view of the terminal for the stator of Embodiment 1, with a coupling part separated therefrom.

The terminal 70 for a stator is placed above the upper resin layer 62. The terminal 70 for a stator is attached to one end of the core 90. As shown in FIGS. 4 through 6, the terminal 70 for a stator includes two first welded portions 21, two second welded portions 22, and two third welded portions 23. The terminal 70 for a stator includes a first extending portion 26, a second extending portion 27, and a third extending portion 28, as well as a first terminal portion 41, a second terminal portion 42, and a third terminal portion 43. Further, the terminal 70 for a stator includes a coupling part 80. It should be noted that for the sake of viewability, FIGS. 5 and 6 show the terminal 70 for a stator with shades of gray.

Figure 7:
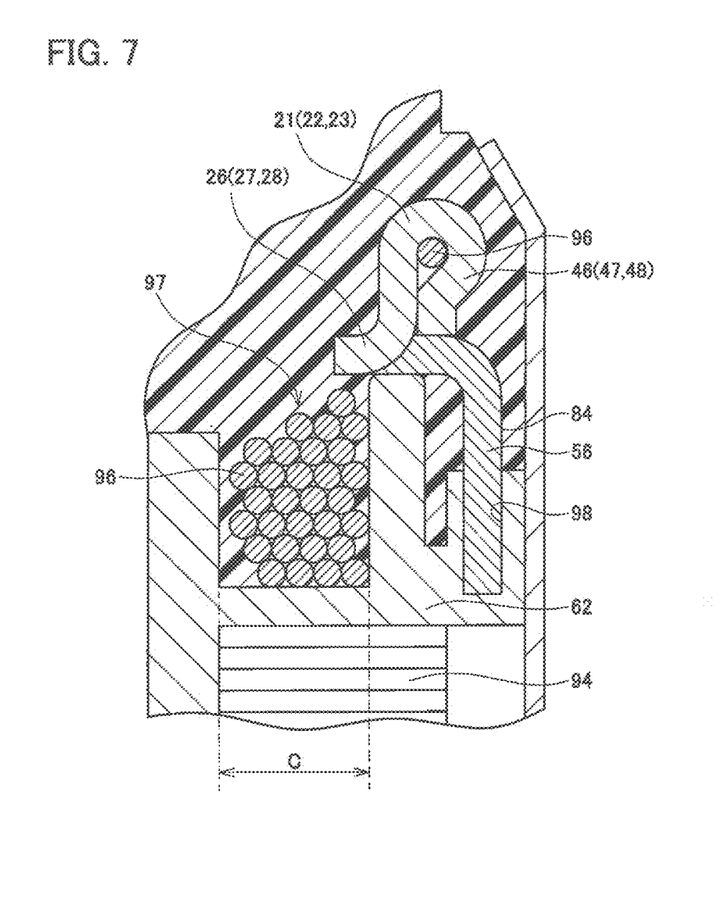
FIG. 7 is a partially enlarged view of the stator of Embodiment 1.

The first welded portions 21, the second welded portions 22, and the third welded portions 23 are welded to a coil wire 96 of a U phase (which is an example of a first phase), a coil wire 96 of a V phase (which is an example of a second phase), and a coil wire 96 of a W phase (which is an example of a third phase), respectively. The plurality of first, second, and third welded portions 21, 22, and 23 are placed at intervals in the circumferential direction, respectively. The first welded portions 21, the second welded portions 22, and the third welded portions 23 are coupled to the first extending portion 26, the second extending portion 27, and the third extending portion 28, respectively. Each of the welded portions 21, 22, and 23 is formed in a curved shape. Each of the welded portions 21 includes a first hook portion 46. Each of the welded portions 22 includes a second hook portion 47. Each of the welded portions 23 includes a third hook portion 48. The hook portions 46, 47, and 48 extend obliquely toward outer circumferential sides and downward from the upper ends of the welded portions 21, 22, and 23, respectively. As shown in FIGS. 2 and 7, the welded portions 21, 22, and 23 are welded with the hook portions 46, 47, and 48 in a state of being hooked on the coil wires 96, respectively. This causes the welded portions 21, 22, and 23 to be fixed to the coil wires 96. The two first welded portions 21 are formed in such positions as to face each other across a central part of the terminal 70 for a stator. That is, the pair of first welded portions 21 is formed at two positions 180 degrees apart from each other in a circumferential direction of the terminal 70 for a stator. Similarly, the two second welded portions 22 are formed in such positions as to face each other across the central part of the terminal 70 for a stator. That is, the pair of second welded portions 22 is formed at two positions 180 degrees apart from each other in the circumferential direction of the terminal 70 for a stator. Similarly, the two third welded portions 23 are formed in such positions as to face each other across the central part of the terminal 70 for a stator. That is, the pair of third welded portions 23 is formed in at two positions 180 degrees apart from each other in the circumferential direction of the terminal 70 for a stator. Each of the welded portions 21, 22, and 23 is placed on an outer side of a coil winding portion.

The first extending portion 26, the second extending portion 27, and the third extending portion 28 each extend in an arc shape in the circumferential direction. The extending portions 26, 27, and 28 are placed above the teeth 94, respectively. Each of the extending portions 26, 27, and 28 has a shape of a bending rectangular piece of metal.

The first extending portion 26 overlaps the second extending portion 27 in a radial direction at one part in the circumferential direction and overlaps the third extending portion 28 in the radial direction at another part in the circumferential direction. The second extending portion 27 overlaps the first extending portion 26 in the radial direction at one part in the circumferential direction and overlaps the third extending portion 28 in the radial direction at another part in the circumferential direction. The third extending portion 28 overlaps the first extending portion 26 in the radial direction at one part in the circumferential direction and overlaps the second extending portion 27 in the radial direction at another part in the circumferential direction. The extending portions 26, 27, and 28 are placed at intervals. In the present embodiment, a part of the first extending portion 26 in the circumferential direction is placed at an inner side than a part of the second extending portion 27 in the circumferential direction. Another part of the first extending portion 26 in the circumferential direction is placed, at an outer side than a part of the third extending portion 28 in the circumferential direction. Another part of the second extending portion 27 in the circumferential direction is placed at an outer side than another part of the third extending portion 28 in the circumferential direction. In the area A indicated by a dashed line in FIG. 6, the first extending portion 26 and the second extending portion 27 overlap each other. In the area B indicated by a dashed line in FIG. 6, the second extending portion 27 and the third extending portion 28 overlap each other. In the area C indicated by a dashed line in FIG. 6, the third extending portion 28 and the first extending portion 26 overlap each other. Further, in the area A, the first extending portion 26 and the third extending portion 28 do not overlap each other. In the area B, the first extending portion 26 and the second extending portion 27 do not overlap each other. In the area C, the third extending portion 28 and the second extending portion 27 do not overlap each other. Thus, extending portions of two phases overlap each other.

The first terminal portion 41, the second terminal portion 42, and the third terminal portion 43 are placed at intervals from each other, and are coupled to the first extending portion 26, the second extending portion 27, and the third extending portion 28, respectively. Each of the terminal portions 41, 42, and 43 extends upward, and protrudes from the upper end of the stator 60 through the upper resin layer 62 to a position higher than the upper resin layer 62. Each of the terminal portions 41, 42, and 43 is connected to an external power source. The first terminal portion 41 is connected to one end of the first extending portion 26. The first extending portion 26 extends from the first terminal portion 41 for a longer distance in a counterclockwise direction than in a clockwise direction. The second terminal portion 42 is coupled to a central part of the second extending portion 27. The second extending portion 27 extends from the second terminal portion 42 for about a same distance both in clockwise and counterclockwise directions. The third terminal portion 43 is coupled to one end of the third extending portion 28. The third extending portion 28 extends from the third terminal portion 43 for a longer distance in the clockwise direction than in the counterclockwise direction.

Figure 8:
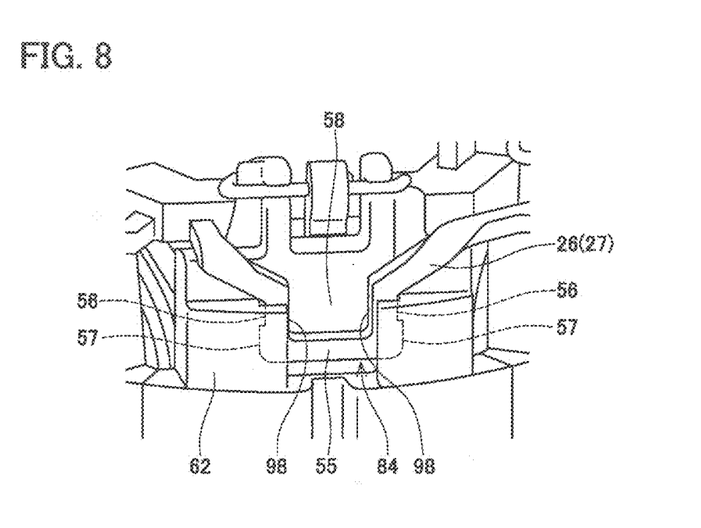
FIG. 8 is a partially enlarged view of the stator of Embodiment 1.
Figure 9:
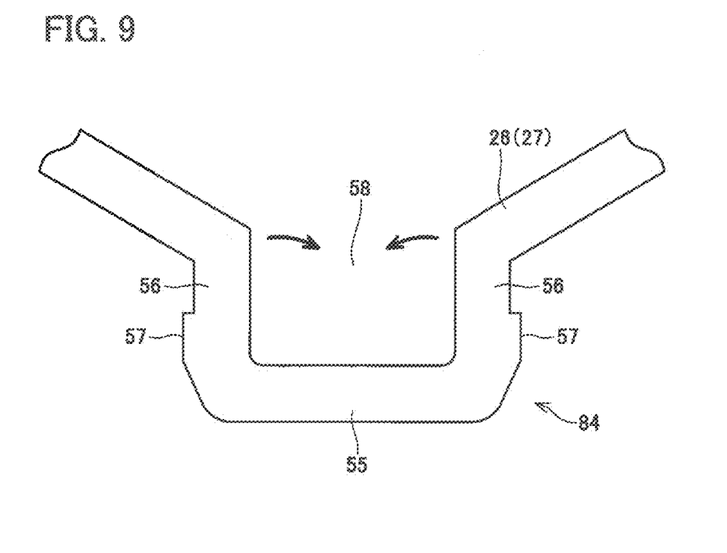
FIG. 9 is a partially enlarged view of the terminal for the stator of Embodiment 1.

The first extending portion 26 and the second extending portion 27 include insertion parts 84 protruding downward. In the present embodiment, the third extending portion 28 does not include an insertion part. The first extending portion 26 and the second extending portion 27 are each formed with a plurality of insertion parts 84. Each of the insertion parts 84 extends toward the core 90. The insertion parts 84 are formed by partially bending the extending portions 26 and 27, respectively. The plurality of insertion parts 84 are formed at intervals in the circumferential direction. Each of the insertion parts 84 is placed at an outer side than an outer circumferential surface of the core 90. The insertion parts 84 are formed below the welded portions 21, 22, and 23, respectively. The insertion parts 84 are inserted into the upper insertion trenches 98. As shown in FIGS. 8 and 9, each of the insertion parts 84 includes a bottom portion 55 and a pair of press-fitting portions 56, 56. The press-fitting portions 56 extend downward to the core 90. A space 58 is formed between the two press-fitting portions 56 in each pair. The distance between the two press-fitting portions 56 in each pair 56, 56 is greater than the distance between the two upper insertion trenches 98 in each pair 98, 98. Each of the press-fitting portions 56 is formed with a pressed portion 57. The pressed portion 57 protrudes outward from the press-fitting portion 56. A pair of press-fitting portions 56, 56 is inserted into a pair of insertion trenches 98, 98. When a pair of press-fitting portions 56, 56 is inserted into a pair of upper insertion trenches 98, 98, the pressed portions 57 are pressed from outside and bent inward as indicated by arrows in FIG. 9. Thus, the insertion parts 84 are pressed to be inserted into the upper insertion trenches 98 in an elastically deformed state. The two press-fitting portions 56 in each pair 56, 56 have their lower ends coupled to the bottom portion 55. The two press-fitting portions 56 in each pair 56, 56 are connected to each other by the bottom portion 55.

As shown in FIGS. 4 and 5, the first extending portion 26, the second extending portion 27, and the third extending portion 28 are united by the coupling part 80. The coupling part 80 is made of resin. The coupling part 80 has a polygonal ring shape. The coupling part 80 covers each of the extending portions 26, 27, and 28.

Figure 10:
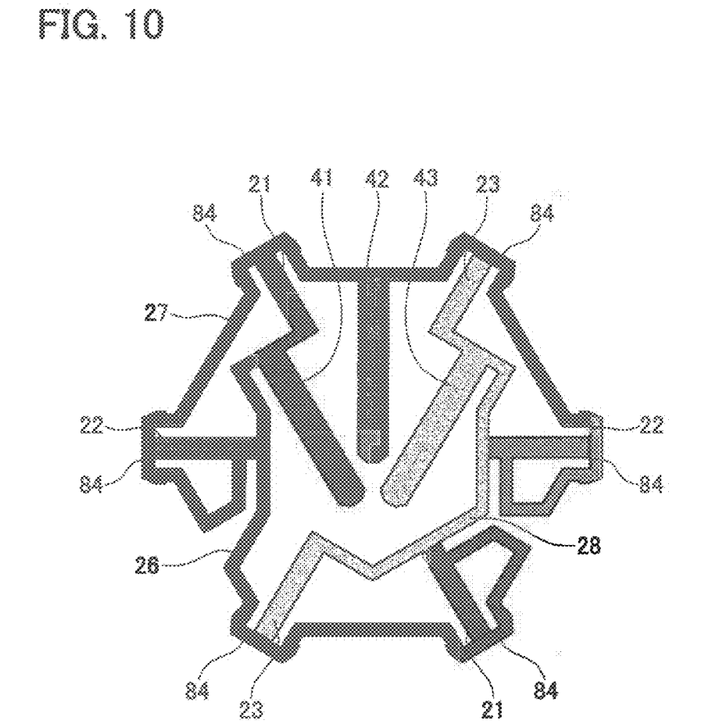
FIG. 10 is a top view of intermediate components of the terminal for the stator of Embodiment 1.

The extending portions 26, 27, and 28, the welded portions 21, 22, and 23, and the terminal portions 41, 42, and 43 are each formed by pressing a single flat sheet. The insertion parts 84 are formed by bending several parts of the first and second extending portions 26 and 27 out of the single flat sheet. After the press working, the extending portions 26, 27, and 28 are integrally coupled to one another by the welded portions 21, 22, and 23 as shown in FIG. 10. Next, intermediate components obtained by the press working are placed in a mold such that the coupling part 80 is molded. Then, the welded portions 21, 22, and 23 by which the extending portions 26, 27, and 28 are coupled are cut off, whereby the terminal 70 for a stator is produced.

A common terminal 71 is attached to the other end of the core 90 as shown in FIGS. 1 through 3. The common terminal 71 includes a plurality of insertion parts 78 and a plurality of welded portions 79. The plurality of insertion parts 78 is placed at intervals from one another in the circumferential direction. The plurality of insertion parts 78 is placed below the plurality of teeth 94, respectively. The plurality of insertion parts 78 of the common terminal 71 is attached to the lower insertion trenches 92 corresponding to the U-phase teeth 94 (i.e. the lower insertion trenches 92 at the same positions as the teeth 94 in the circumferential direction of the annular portion 91), the lower insertion trenches 92 corresponding to the V-phase teeth 94, and the lower insertion trenches 92 corresponding to the W-phase teeth 94, respectively. The plurality of welded portions 79 of the common terminal 71 are welded to the coil wires 96 wound around the teeth 94, respectively. This causes the common terminal 71 to be electrically connected to the coil wires 96.

A terminal for a stator of the present embodiment includes: a plurality of welded portions (i.e. first welded portions 21, second welded portions 22, and third welded portions 23); and a plurality of extending portions (i.e. a first extending portion 26, a second extending portion 27, and a third extending portion 28). Each of the extending portions 26, 27, and 28 extends in an arc shape in a circumferential direction. Part of each of the extending portion overlaps part of another extending portion in a radial direction. In this configuration, the overlapping amount among the plurality of extending portions is small. This makes it possible to reduce the amount of space in which the plurality of extending portions are placed and reduce the size of a terminal for a stator.

Embodiment 2

Figure 11:
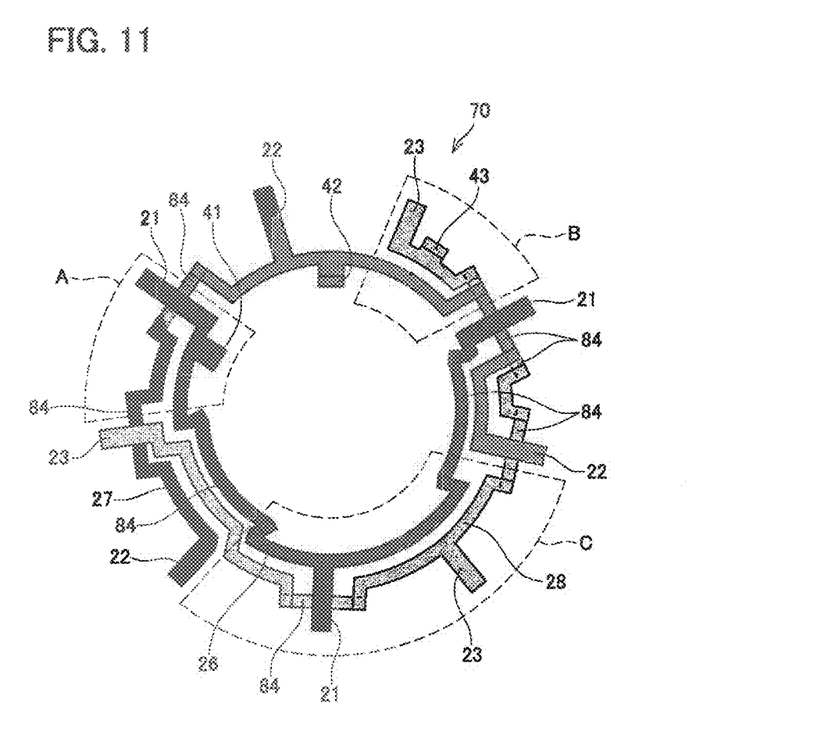
FIG. 11 is a top view of a terminal for a stator of Embodiment 2, with a coupling part separated therefrom.
Figure 12:
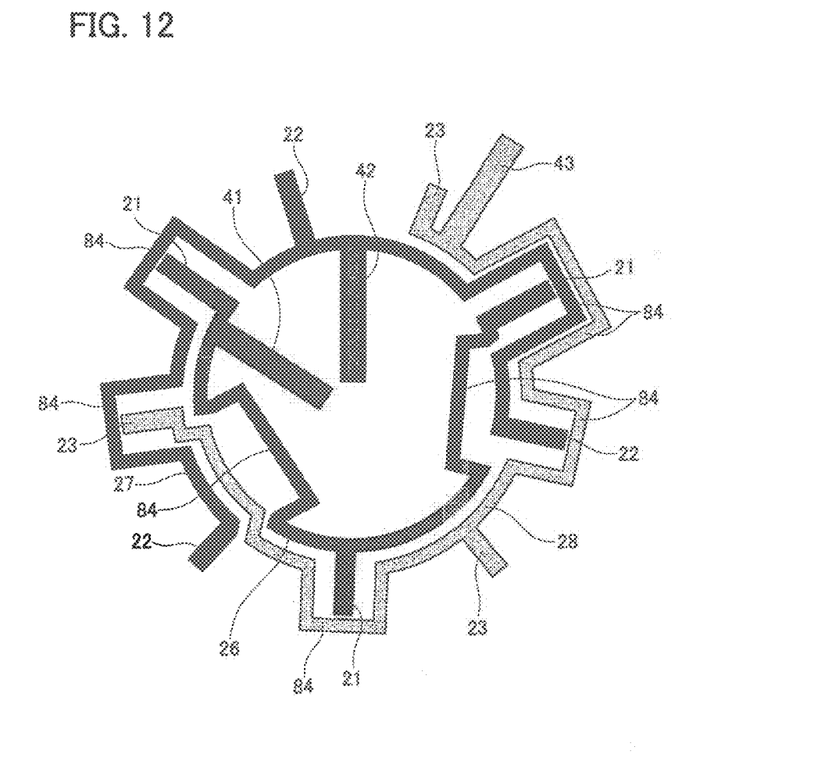
FIG. 12 is a top view of intermediate components of a terminal for a stator of Embodiment 2.

As shown in FIGS. 11 and 12, a terminal 70 for a stator of Embodiment 2 includes three first welded portions 21, three second welded portions 22, and three third welded portions 23. The plurality of welded portions 21, 22, and 23 are each formed at intervals, respectively. Specifically, the three first welded portions 21 are placed at intervals of 120 degrees in a circumferential direction. Similarly the three second welded portions 22 are placed at intervals of 120 degrees in the circumferential direction. Similarly, the three third welded portions 23 are placed at intervals of 120 degrees in the circumferential direction. Further, as in Embodiment 1, the first extending portion 26 overlaps the second extending portion 27 in a radial direction at one part in the circumferential direction and overlaps the third extending portion 28 in the radial direction at another part in the circumferential direction. The second extending portion 27 overlaps the first extending portion 26 in the radial direction at one part in the circumferential direction and overlaps the third extending portion 28 in the radial direction at another part in the circumferential direction. The third extending portion 28 overlaps the first extending portion 26 in the radial direction at one part in the circumferential direction and overlaps the second extending portion 27 in the radial direction at another part in the circumferential direction. In Embodiment 2, in the area A indicated by a dashed line in FIG. 11, the first extending portion 26 and the second extending portion 27 overlap each other. In the area B indicated by a dashed line in FIG. 11, the second extending portion 27 and the third extending portion 28 overlap each other. In the area C indicated by a dashed line in FIG. 11, the third extending portion 28 and the first extending portion 26 overlap each other. Further, in the area A, the first extending portion 26 and the third extending portion 28 do not overlap each other. In the area B, the first extending portion 26 and the second extending portion 27 do not overlap each other. In the area C, the third extending portion 28 and the second extending portion 27 do not overlap each other. Thus, extending portions of two phases overlap each other.

In the terminal 70 for a stator of Embodiment 2, the first extending portion 26, the second extending portion 27, and the third extending portion 28 each include a plurality of insertion parts 84. The insertion parts 84 are formed at intervals in the circumferential direction.

The terminal 70 for a stator of Embodiment 2 can bring forth the same effects as those brought forth by the terminal 70 for a stator of Embodiment 1.

The embodiments of the present invention have been described in detail above; however, these embodiments are merely illustrative, and are not intended to limit the scope of the patent claims. Various modifications and alterations to the specific examples described above are encompassed in the technical scope of the patent claims.

(1) In Embodiment 1, an insertion part is not provided to the third extending portion 28. However, this configuration does not imply any limitation, and the third extending portion 28 may be provided with an insertion part. As long as at least one of the first, second, third extending portions 26, 27, and 28 is formed with an insertion part 84, the terminal 70 for a stator can be attached to one end of the core 90.

(2) In each of Embodiments 1 and 2, the first welded portions 21, the second welded portions 22, and the third welded portions 23 are welded to a coil wire 96 of a U phase, a coil wire 96 of a V phase, and a coil wire 96 of a W phase, respectively. However, this corresponding relation does not imply any limitation, and the corresponding relation between the U, V, and W phases and the welded portions 21, 22, and 23 may be altered as appropriate.

What is claimed is:

1. A terminal for a stator of a three-phase motor, the terminal comprising:
   a plurality of first welded portions welded to a coil wire of a first phase;
   a first extending portion to which the plurality of first welded portions is coupled, the first extending portion extending in an arc shape in a circumferential direction, the plurality of first welded portions being placed at an interval between each other in the circumferential direction, the circumferential direction is a same direction as a rotation direction of the three-phase motor;
   a plurality of second welded portions welded to a coil wire of a second phase;
   a second extending portion to which the plurality of second welded portions is coupled, the second extending portion extending in an arc shape in the circumferential direction, the plurality of second welded portions being placed at an interval between each other in the circumferential direction;
   a plurality of third welded portions welded to a coil wire of a third phase; and
   a third extending portion to which the plurality of third welded portions is coupled, the third extending portion extending in an arc shape in the circumferential direction, the plurality of third welded portions being placed at an interval between each other in the circumferential direction,
   wherein
   the first extending portion overlaps the second extending portion in a radial direction at one part in the circumferential direction and overlaps the third extending portion in the radial direction at another part in the circumferential direction, the radial direction extends from a rotation center to a circumference of the three-phase motor,
   the second extending portion overlaps the first extending portion in the radial direction at one part in the circumferential direction and overlaps the third extending portion in the radial direction at another part in the circumferential direction,
   the third extending portion overlaps the first extending portion in the radial direction at one part in the circumferential direction and overlaps the second extending portion in the radial direction at another part in the circumferential direction,
   no part of the first extending portion, the second extending portion and the third extending portion all simultaneously overlap in the radial direction at any point along the circumferential direction,
   a thickness of the first extending portion in an axial direction of rotation of the three-phase motor is thinner than a thickness of the first extending portion in the radial direction,
   a thickness of the second extending portion in the axial direction of rotation of the three-phase motor is thinner than a thickness of the second extending portion in the radial direction, and
   a thickness of the third extending portion in the axial direction of rotation of the three-phase motor is thinner than a thickness of the third extending portion in the radial direction;

at least one of the first, second, and third extending portions includes an insertion part extending toward a core of the stator, the insertion part is formed by bending the extending portion, and is inserted into an insertion trench formed at an end of the core, with the insertion part being elastically deformed, and the insertion part includes a pair of press-fitting portions inserted into the insertion trench formed at the one end of the core and a bottom portion which connects lower ends of the pair of press-fitting portions, with a space formed between the pair of press-fitting portions.

2. The terminal for a stator according to claim 1, wherein the first welded portion, the second welded portion, and the third welded portion each include an upper end and a hook portion extending slantingly toward an outer circumferential side and downward from the upper end.

3. The terminal for a stator according to claim 1, wherein the first welded portion, the second welded portion, the third welded portion, and the insertion part are placed on an outer side of a coil winding portion.

\* \* \* \* \*